United States Patent [19]
Klein

[11] Patent Number: 4,934,793
[45] Date of Patent: Jun. 19, 1990

[54] NVG COMPATIBLE LCD

[75] Inventor: Herman C. Klein, Los Angeles, Calif.

[73] Assignee: McDonnell Douglas Corporation, St. Louis, Mo.

[21] Appl. No.: 203,752

[22] Filed: Jun. 7, 1988

[51] Int. Cl.$^5$ .............................................. G02F 1/13
[52] U.S. Cl. ...................... 350/345; 350/338; 350/339 F; 362/62
[58] Field of Search .................. 350/338, 345, 339 F; 362/62

[56] References Cited

U.S. PATENT DOCUMENTS

| | | | |
|---|---|---|---|
| 4,071,912 | 2/1978 | Budmiger | 350/339 F |
| 4,518,225 | 5/1985 | Fredrickson et al. | 350/338 |
| 4,559,582 | 12/1985 | Scardilli et al. | 362/23 |
| 4,580,196 | 4/1986 | Task | 362/62 |
| 4,655,553 | 4/1987 | Klein | 350/345 |
| 4,659,183 | 4/1987 | Suzawa | 350/345 |

FOREIGN PATENT DOCUMENTS 3618516 6/1987 France .................. 350/345

Primary Examiner—Andrew J. James
Assistant Examiner—Huy K. Mai
Attorney, Agent, or Firm—Edward H. Renner

[57] ABSTRACT

A night vision compatible display employing a liquid crystal display, and an infrared attenuating filter having characteristics which permit a high degree of infrared attenuation while transmitting substantial amounts of visible light, in combination with an incandescent source and reflector for backlighting a liquid crystal display through the infrared filter so that the liquid crystal provides a fully readable, high contrast display when sufficeintly trans-illuminated through the filter to produce light having a spectral content highly compatible with direct vision and the use of infrared sensitive GEN III night vision goggles and other night vision equipment in a night vision environment.

14 Claims, 1 Drawing Sheet

NVG COMPATIBLE LCD

FIELD OF THE INVENTION

This invention relates in general to liquid crystal displays (LCDs) and particularly to illumination of LCDs for night vision applications.

BACKGROUND OF THE INVENTION

Effective illumination of liquid crystal displays (LCDs) to permit clear, crisp viewing under a variety of ambient lighting conditions has been and continues to be an area of intense scientific, engineering, and business interest. For example, new markets have developed for lightweight laptop computers and other devices demanding high visibility LCDs used in applications where ambient illumination varies from zero, or total darkness, to bright sunlight. Backlighting with supertwist crystal displays has been developed to satisfy these illumination extremes. With respect to such technology, applicant respectfully identifies U.S. Pat. No. 4,655,553 issued to applicant's assignee. The disclosure of that patent is incorporated by reference herein.

The problem which the present invention solves relates to the need to provide nighttime instrument visibility, for example, in the cockpit of a military aircraft, where night vision goggles, particularly of the GEN III type, are being worn by some, but not necessarily all crew members. Both the users of such goggles and those directly viewing cockpit instruments employing liquid crystal displays should be able to clearly see information presented by such displays when they are backlit or trans-illuminated for use in a night vision cockpit environment. Similar night vision applications for the present invention exist in other types of vehicles, such as, but not limited to military tanks and ships.

Color and intensity of illumination of instruments, especially those employing liquid crystal displays (LCDs) which require ambient, integral, or backlighting to be visible has been determined for particular applications, including those within an aircraft. The present invention addresses the problem of spectral content of the illumination in a display system where both direct viewing and viewing through GEN III night vision goggles is required in a night vision environment.

In situations where night vision goggles are being used by military flight crews to enhance terrain visibility outside the aircraft in minimal, natural, nighttime illumination conditions, the visibility of illuminated LCD instrumentation in the cockpit becomes a serious problem. The illuminated or trans-illuminated LCD displays obtain light typically from incandescent bulbs. The infrared radiation emitted by incandescent bulbs is communicated through the rear of the LCD to the observer in front. An observer wearing night vision goggles will see only a green blur with no visible LCD characters if a green type A filter specified in MIL-L-85762 is used in front of the LCD between it and the observer to remove infrared radiation on its way from the LCD to the observer. It should be obvious that use of any filter in front of the LCD diminishes the light transmitted through the crystals and available to the observer. In addition, a frontal filter eliminates the benefit of ambient incident light reaching and being reflected by the liquid crystal display. If the incandescent backlighting is increased to overcome the attenuation caused by frontal filtering, the observer wearing night vision goggles sees an even greater blur as a result of the blooming effect the infrared radiation has on the goggles. If the incandescent illumination is reduced to a threshold level below which blooming will not occur, the crystal illumination level is inadequate for viewing with the naked eye.

The problem of appropriately illuminating liquid crystal displays which are employed as readouts for various input devices may be more pronounced depending on the construction of the LCD itself. Thus a multi-layer LCD may have a two per-cent light transmission factor. With little or no ambient light for reflected illumination, a multilayer LCD will require a substantial level of backlighting with a corresponding high level of infrared output being transmitted through to the observer. The observer using infrared sensitive night vision goggles or other night vision equipment will, therefore, be blinded or have night vision impairment to an unacceptable degree. The offending infrared must be removed or eliminated to a degree that it does not interfere with the use of the night vision equipment.

SUMMARY OF THE INVENTION

Accordingly, it is an object of the present invention to provide illumination for a liquid crystal display that is compatible with night vision equipment.

Another object of the invention is to provide an illumination source for use in illuminating a liquid crystal display in a night vision environment so that viewers with and without night vision goggles can see the display legibly.

Yet another use of the invention is to provide for removal of the infrared radiation emanating from an incandescent source used to illuminate the immediate environment in which night vision apparatus is being used.

Still another object of the invention is to provide virtually infrared free illumination from an incandescent source used to illuminate LCD instruments and their immediate environment in which night vision equipment is being used, particularly night vision goggles which are extremely infrared sensitive and inherently susceptible to infrared caused image blooming.

Other objects and a fuller understanding of the invention may be had by referring to the following description and claims, taken in conjunction with the accompanying drawings in which:

DETAILED DESCRIPTION

Figure 3:
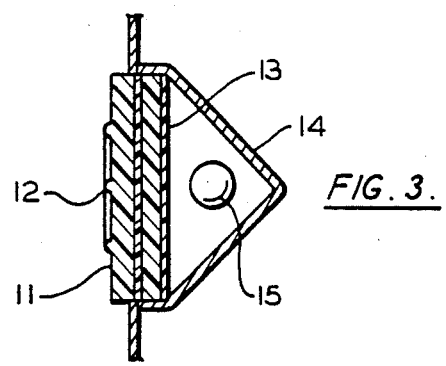
FIG. 3 is a side sectional view of the rear illuminated display portion of the invention.
Figure 1:
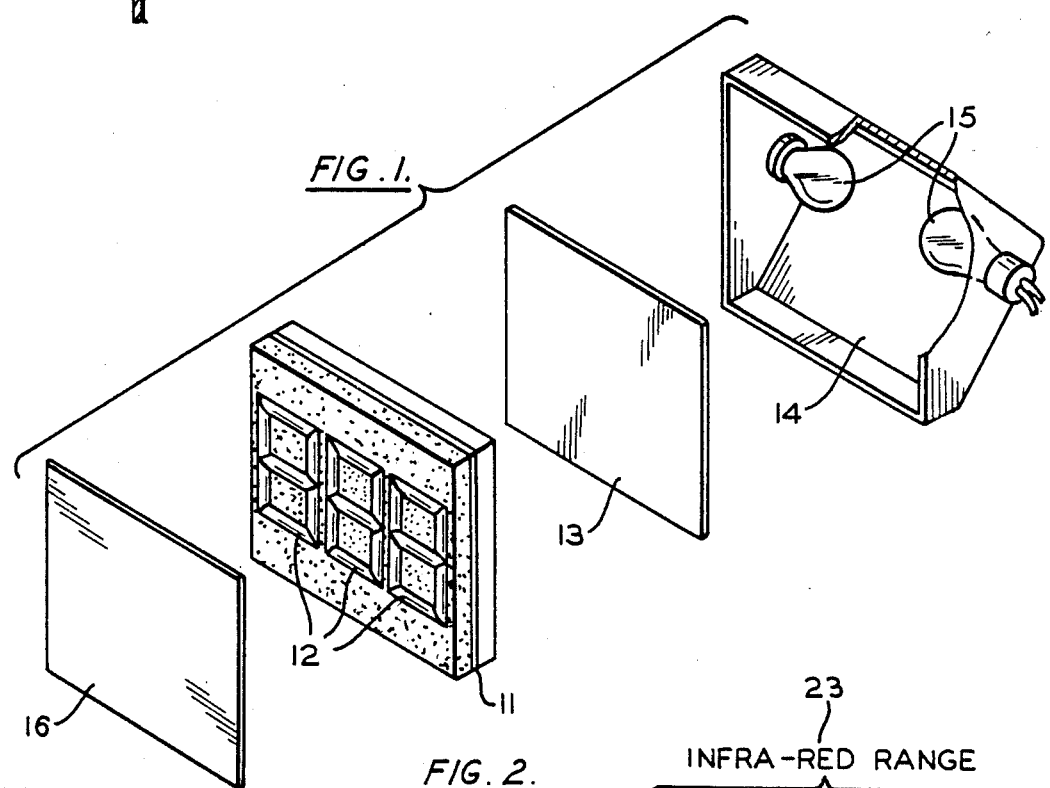
FIG. 1 is a perspective view of the present invention.

Referring to FIG. 1, double layer dichroic liquid crystal display 11 is shown with seven-bar displays 12 which require illumination for visibility when electrically excited. The electrical connections required to drive each of the seven-bar displays are not shown in FIG. 1 since they are not relevant to discussion of the present invention. Visible illumination from incandescent lamps 15 is concentrated and directed by means of reflector 14 to the rear of filter 13. The combined liquid crystal display 11 backed by filter 13 which is rear illuminated by incandescent lamps 15, all enclosed by rear located reflector 14 is shown in FIG. 3. Night vision filter 16 is in the GEN III night vision goggles which are worn by users viewing the night vision environment by means of its infrared illumination and radiation, and viewing the illuminated display of the present invention.

Figure 2:
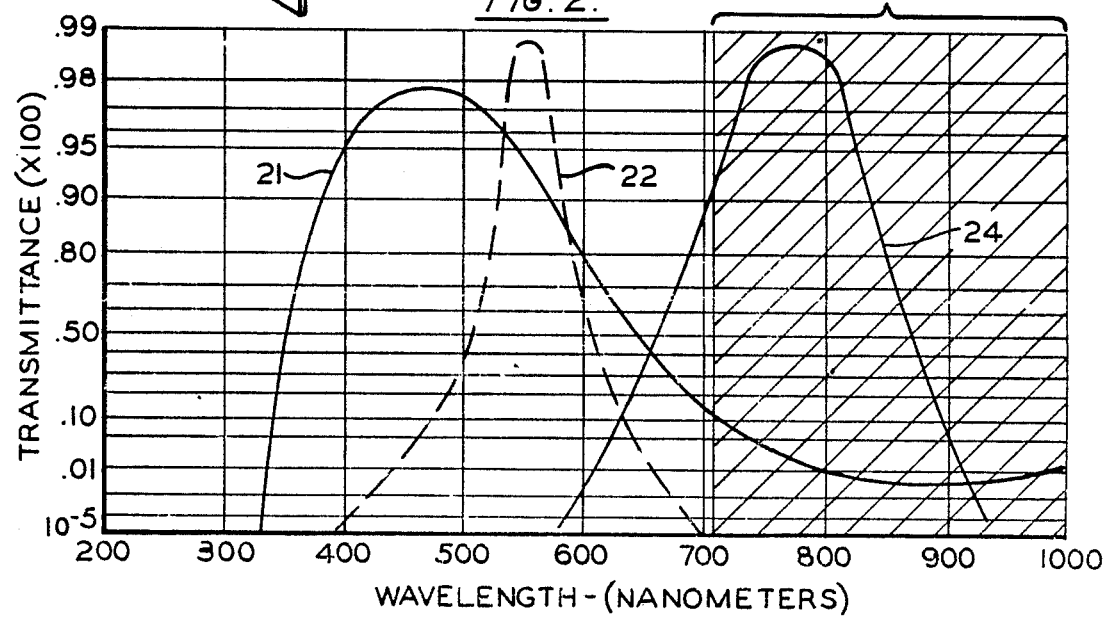
FIG. 2 is a graph of the spectral response characteristics of the preferred embodiment of the present invention, the human eye, and GEN III night vision goggles.

Filter 13 is a blue-green, red-absorbing filter made of a substrate of optical quality glass or plastic and having the transmittance characteristic 21 relative to the human eye characteristic 22 and the night vision GEN III goggle characteristic 24 shown in FIG. 2. The low end of the infrared range 23 is shown shaded. It should be obvious from FIG. 2 that the filter characteristic 21 of the present invention dramatically attenuates the infrared radiation which is a component of the incandescent illumination and which is incompatible with night vision equipment. Further, FIG. 2 shows that the transmittance characteristic 21 of the present invention is significantly compatible with the human eye characteristic 22.

The transmittance characteristic 24 of the GEN III night vision goggle, as shown in FIG. 2, clearly passes infrared. The attenuation of the incandescent produced infrared by the present invention permits the use of the GEN III goggles to clearly see the information presented by the back-illuminated LCD 11 without the undesirable blooming that would otherwise occur and without interfering with the viewing through said goggles of the illuminated or un-illuminated external and internal night operations environments.

Based on FIG. 2 and actual test configurations of the present invention, it has been shown that the attenuation characteristics for a 1.5 mm filter thickness, as shown in FIG. 2, can be further enhanced by increasing the filter thickness.

Thus, filter 13 of the present invention permits a high level of incandescent backlighlight of LCD 11. This results in the numeric information created by the electrically activated seven-bar displays 12 being made highly visible to flight crew members whether using night vision equipment or not. Regardless of the intensity level to which the incandescent lamps 15 are set, objectionable infrared radiation from said lamp is attenuated to such a degree that no interference with night vision equipment occurs.

In the preferred embodiment of the present invention a filter found to be satisfactory in combination with the GEN III night vision goggles is a model BG-38 from Schott Glass Co. Incandescent lamps 15 for the LCD illumination source are General Electric MS 24367-715 bulbs.

Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. An apparatus for night vision compatible illumination of liquid crystal displays, comprising,
   a reflector for directing illumination to the entire rear surface of a liquid crystal display, a source of illumination located in front of said reflector,
   an infrared attenuating filter located in front of said source of illumination and behind and coextensive with the rear surface of said liquid crystal display, such that all illumination is communicated through the rear surface of said liquid crystal display by way of said filter, the infrared attenuating filter reducing most of the level of infrared spectral content sufficiently to permit liquid crystal display readability compatible with the use of night vision equipment and to a level sufficiently low to prevent interference with the normal operation of the night vision equipment.

2. The apparatus of claim 1 wherein said infrared attenuating filter is a blue-green, red absorbing, optically transmitting substrate.

3. The apparatus of claim 1 wherein said filter has a transmittance characteristic with a peak of 97.5% at 475±50 nanometers and an infrared transmittance of 10% at the 700+25 nanometer low end infrared threshhold.

4. The apparatus of claim 1 wherein said source of illumination is an incandescent lamp.

5. The apparatus of claim 1 wherein the amount of infrared attenuation is adjustable by varying the thickness of said filter.

6. A night vision display system comprising, night vision goggles,
   a liquid crystal display capable of being electrically connected as a readout for an input device,
   a reflector for directing illumination to the rear surface of said liquid crystal display,
   a source of illumination located in front of said reflector,
   an infrared attenuating filter located in front of said source of illumination and behind and coextensive with the rear surface of said liquid crystal display, such that all illumination communicated through the rear surface of said liquid crystal display contains levels of infrared spectral content reduced sufficiently, without diminishing the magnitude of the remaining visible spectral content, to permit liquid crystal display readability compatible with the use of night vision equipment by observers viewing the display directly and those viewing with said night vision goggles.

7. The night vision display system of claim 6 wherein said night vision goggles are GEN III.

8. The night vision display system of claim 7 wherein said filter has a transmittance characteristic which maximizes the readability of the information presented by the display to a viewer observing the display through GEN III night vision goggles in a night vision environment.

9. The night vision display system of claim 7 wherein said filter has a transmittance characteristic which maximizes the readability of the information presented by the display to viewers simultaneously observing it directly and through GEN III night vision goggles in a night vision environment.

10. The night vision display system of claim 6, wherein said filter has means for maximizing the transmittance characteristic and the readability of the information presented by the display to a viewer observing the display directly in a night vision environment.

11. The method of visibly displaying information in a dichroic liquid crystal display compatibly to direct viewers and viewers using night vision aids in a night vision environment, which comprises the steps of;
   (a) energizing a source of illumination located behind said display,
   (b) reflecting the illumination from said source toward the rear of said liquid crystal display,
   (c) filtering most of the infrared content of the illumination between the source of the illumination and the rear of the liquid crystal display with an infrared attenuating filter to a level sufficiently low to prevent interference with the normal operation of the night vision aids, and (d) filtering the illumination exiting the front surface of said display through a night vision filter located between the liquid crystal display and the viewer.

12. The method of claim 11 wherein said infrared attenuating filter has a transmittance characteristic with a peak of 97.5% at 475±50 nanometers and an infrared transmittance of 10% at the 700±25 nanometer low end infrared threshhold.

13. The method of claim 11 wherein said night vision filter has a transmittance characteristic of a GEN III type filter having a transmittance peak greater than 98% between 725 and 825 nanometers and a bandwidth of 150 to 200 nanometers.

14. A night vision display system comprising;

(a) a night vision viewing means
(b) a dichroic display means,
(c) a means for illuminating said dichroic display means through its rear surface,
(d) means for filtering most of the infrared radiation created by said illumination means, and located between said illumination means and the rear surface of said dichroic display means, said filtering means reducing the infrared radiation to a level sufficiently low to prevent interference with the normal operation of the night vision viewing means and further comprising
(e) means for reflecting and concentrating the radiation created by said illumination means upon the rear surface of said dichroic display means, and
(f) wherein said night vision viewing means is a GEN III type filter.

* * * * *

UNITED STATES PATENT AND TRADEMARK OFFICE
CERTIFICATE OF CORRECTION

PATENT NO. : 4,934,793

DATED : June 19, 1990

INVENTOR(S) : Herman C. Klein

It is certified that error appears in the above-identified patent and that said Letters Patent is hereby corrected as shown below:

Column 4, line 14, delete 700+25, insert $700\pm25$.

Signed and Sealed this

Twenty-fifth Day of June, 1991

*Attest:*

*Attesting Officer*

HARRY F. MANBECK, JR.

*Commissioner of Patents and Trademarks*